United States Patent
Palazzolo

(10) Patent No.: US 9,497,140 B2
(45) Date of Patent: Nov. 15, 2016

(54) AUTONOMOUS MULTI-NODE NETWORK CONFIGURATION AND SELF-AWARENESS THROUGH ESTABLISHMENT OF A SWITCH PORT GROUP

(71) Applicant: International Business Machines Corporation, Armonk, NY (US)

(72) Inventor: Aaron S. Palazzolo, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 113 days.

(21) Appl. No.: 14/277,075

(22) Filed: May 14, 2014

(65) Prior Publication Data

US 2015/0333926 A1 Nov. 19, 2015

(51) Int. Cl.
*H04L 12/28* (2006.01)
*H04L 12/931* (2013.01)
*H04L 12/46* (2006.01)
*H04L 12/947* (2013.01)
(Continued)

(52) U.S. Cl.
CPC ........... *H04L 49/00* (2013.01); *H04L 12/4641* (2013.01); *H04L 12/4675* (2013.01); *H04L 12/6418* (2013.01); *H04L 49/25* (2013.01); *H04L 61/2007* (2013.01)

(58) Field of Classification Search
CPC . H04L 41/0654; H04L 45/245; H04L 47/41; H04L 49/10; H04L 49/354; H04L 49/70; H04L 49/00; H04L 49/254; H04L 49/3045; H04L 49/351; H04L 12/4675; H04L 49/25; H04L 61/2007; H04L 45/38; H04L 69/22
USPC ................................................. 370/339, 401
See application file for complete search history.

(56) References Cited

U.S. PATENT DOCUMENTS

| | | | | |
|---|---|---|---|---|
| 6,807,176 B1 * | 10/2004 | Egbert | ................ | H04L 12/2854 370/392 |
| 8,051,036 B2 | 11/2011 | Klein et al. | | |
| 8,990,374 B2 * | 3/2015 | Otani | .................... | G06F 9/5072 709/223 |

(Continued)

FOREIGN PATENT DOCUMENTS

WO 03027903 A1 4/2003

OTHER PUBLICATIONS

McHugh et al., "Oracle Real Application Clusters in Oracle VM Environments", An Oracle Technical White Paper, Mar. 2012, Version 2.1a, pp. 1-36, Copyright © 2008, Oracle Corporation and/or its affiliates.

*Primary Examiner* — Khaled Kassim
*Assistant Examiner* — Berhanu Belete
(74) *Attorney, Agent, or Firm* — Edward P. Li

(57) ABSTRACT

An approach for autonomous multi-node network configuration and self-awareness is provided. In the approach, a network switch receives a configuration of a switch port group. The switch port group comprises ports configured for a cloud cluster, the cloud cluster comprises nodes, and respective ones of the nodes are connected to respective ones of the ports. In the approach, the network switch receives from one of the nodes a request for information of the switch port group, and sends to the one of the nodes the information of the switch port group. In the approach, the information of the switch port group is stored by the one of the nodes, used by the one of the nodes to assign IP and VLAN addresses to the nodes in the cloud cluster, and used by the one of the nodes to establish a topology of the cloud cluster.

15 Claims, 3 Drawing Sheets

(51) Int. Cl.
*H04L 12/64* (2006.01)
*H04L 29/12* (2006.01)

(56) References Cited

U.S. PATENT DOCUMENTS

| | | | |
|---|---|---|---|
| 2002/0174420 A1 | 11/2002 | Kumar | |
| 2004/0133689 A1* | 7/2004 | Vasisht | H04W 28/18 709/228 |
| 2004/0210754 A1* | 10/2004 | Barron | H04L 63/0428 713/153 |
| 2009/0077478 A1 | 3/2009 | Gillingham et al. | |
| 2009/0106404 A1* | 4/2009 | Christenson | H04L 29/12952 709/222 |
| 2010/0054260 A1* | 3/2010 | Pandey | H04L 49/00 370/395.53 |
| 2010/0110894 A1* | 5/2010 | Smith | H04L 12/2697 370/241 |
| 2010/0313150 A1 | 12/2010 | Morris et al. | |
| 2011/0103391 A1* | 5/2011 | Davis | H04L 45/60 370/400 |
| 2012/0173760 A1* | 7/2012 | Jog | H04L 61/1511 709/245 |
| 2012/0215874 A1* | 8/2012 | Sequeira | H04L 12/12 709/208 |
| 2012/0236761 A1* | 9/2012 | Yang | H04L 61/103 370/259 |
| 2012/0266168 A1* | 10/2012 | Spivak | G06F 9/5055 718/1 |
| 2012/0294192 A1* | 11/2012 | Masood | H04L 12/4645 370/255 |
| 2013/0070762 A1* | 3/2013 | Adams | H04L 49/70 370/389 |
| 2013/0205376 A1* | 8/2013 | Narasimha | H04L 9/3247 726/6 |
| 2013/0235870 A1* | 9/2013 | Tripathi | H04L 45/56 370/390 |
| 2013/0246589 A1* | 9/2013 | Klemba | G06F 9/5072 709/221 |
| 2013/0312006 A1 | 11/2013 | Hardman et al. | |
| 2013/0332917 A1 | 12/2013 | Gaither et al. | |
| 2013/0339510 A1* | 12/2013 | Douglas | H04L 41/5077 709/223 |
| 2014/0092906 A1* | 4/2014 | Kandaswamy | H04L 69/22 370/392 |
| 2014/0129819 A1* | 5/2014 | Huang | G06F 9/4416 713/2 |
| 2014/0143854 A1* | 5/2014 | Lopez | H04L 63/0218 726/14 |
| 2014/0149980 A1* | 5/2014 | Vittal | G06F 9/5072 718/1 |
| 2015/0263991 A1* | 9/2015 | Macchiano | H04L 47/41 370/400 |
| 2015/0319009 A1* | 11/2015 | Zhao | H04L 12/4641 370/392 |

\* cited by examiner

AUTONOMOUS MULTI-NODE NETWORK CONFIGURATION AND SELF-AWARENESS THROUGH ESTABLISHMENT OF A SWITCH PORT GROUP

TECHNICAL FIELD OF THE INVENTION

The present invention relates generally to cloud computing networks, and more particularly to autonomous multi-node network configuration and self-awareness through establishment of a switch port group.

BACKGROUND

Multi-node cloud architectures are typically difficult to install and configure. The more nodes belonging to the cloud, the more manual intervention is necessary to configure each node to see the rest of the network. Nowadays, the existing technologies are manual scripts and DHCP (Dynamic Host Configuration Protocol); however, these technologies do not solve the overall problem about how to get data of surrounding switch ports back to the devices in a multi-node configuration. Typically, IP addresses must be manually entered or pulled via DHCP, and switch port connectivity is only known due to labeled cables or Media Access Control (MAC) address tracing.

SUMMARY

In one aspect, a method for autonomous multi-node network configuration and self-awareness through establishment of a switch port group is provided. In the method, a network switch receives a configuration of the switch port group. The switch port group comprises ports configured for a cloud cluster, the cloud cluster comprises nodes, and respective ones of the nodes are connected to respective ones of the ports. In the method, the network switch receives from one of the nodes a request for information of the switch port group, and sends to the one of the nodes the information of the switch port group. The information comprises IP (Internet Protocol) addresses and VLAN (Virtual Local Area Network) addresses available in the switch port group. In the method, the information of the switch port group is stored by the one of the nodes, the information is used by the one of the nodes to assign the IP and VLAN addresses to the nodes in the cloud cluster, and the information is used by the one of the nodes to establish a topology of the cloud cluster.

In another aspect, a computer program product for autonomous multi-node network configuration and self-awareness through establishment of a switch port group is provided. The computer program product comprises a computer readable storage medium having program code embodied therewith. The program code is executable to receive, by a network switch, a configuration of the switch port group. The switch port group comprises ports configured for a cloud cluster, the cloud cluster comprises nodes, and respective ones of the nodes are connected to respective ones of the ports. The program code is executable to receive from one of the nodes, by the network switch, a request for information of the switch port group. The program code is executable to send to the one of the nodes, by the network switch, the information of the switch port group. The information comprises IP (Internet Protocol) addresses and VLAN (Virtual Local Area Network) addresses available in the switch port group. In the computer program product, the information of the switch port group is stored by the one of the nodes, the information is used by the one of the nodes to assign the IP and VLAN addresses to the nodes in the cloud cluster, and the information is used by the one of the nodes to establish a topology of the cloud cluster.

In yet another aspect, a computer system for autonomous multi-node network configuration and self-awareness through establishment of a switch port group is provided. The computer system comprises one or more processors, one or more computer-readable tangible storage devices, and program instructions stored on at least one of the one or more computer-readable tangible storage devices for execution by at least one of the one or more processors. The program instructions are executable to receive, by a network switch, a configuration of the switch port group. The switch port group comprises ports configured for a cloud cluster, the cloud cluster comprises nodes, and respective ones of the nodes are connected to respective ones of the ports. The program instructions are executable to receive from one of the nodes, by the network switch, a request for information of the switch port group. The program instructions are executable to send to the one of the nodes, by the network switch, the information of the switch port group. The information comprises IP (Internet Protocol) addresses and VLAN (Virtual Local Area Network) addresses available in the switch port group. In the computer system, the information of the switch port group is stored by the one of the nodes, the information is used by the one of the nodes to assign the IP and VLAN addresses to the nodes in the cloud cluster, and the information is used by the one of the nodes to establish a topology of the cloud cluster.

DETAILED DESCRIPTION

Embodiments of the present invention disclose a solution to automate the complex installation and configuration of a multi-node cloud clustered environment. One node belonging to the cloud cluster will communicate with a switch or multiple switches. Each switch provides this node with information including available IPs, MAC (Media Access Control) addresses connected, ports connected, and other useful information that is used for the single node to setup the rest of the cloud cluster. Embodiments of the present invention allow a single node in communication with the switches for a cloud cluster to pull all of this information automatically for all other nodes in the cloud cluster. The node pulling this information can then be used to automatically configure the rest of the nodes and bring the entire cloud cluster online.

Figure 1:
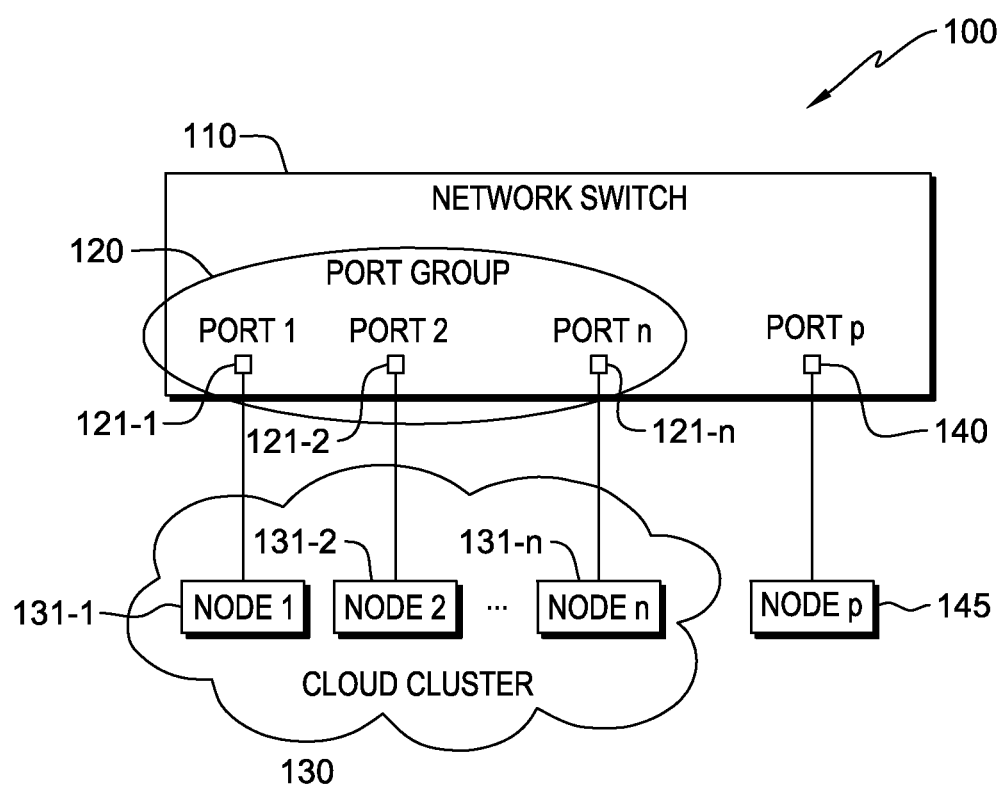
FIG. 1 is a diagram illustrating a network system, in which nodes in a cloud cluster are connected to ports in a port group on a network switch, in accordance with one embodiment of the present invention.

FIG. 1 is a diagram illustrating network system 100, in which nodes in cloud cluster 130 are connected to ports in port group 120 on network switch 110, in accordance with one embodiment of the present invention. Network system 100 comprises network switch 110. Network switch 110 is a computer networking device that is used to connect devices together on a computer network by performing a form of packet switching. Network switch 110 comprises ports 1 though n (denoted by numerals 121-1 though 121-*n*). Ports 1 through n (121-1 though 121-*n*) are within port group 120.

Referring to FIG. 1, port group 120 is configured by a user such that it belongs to all nodes in cloud cluster 130. A node can be a computer device or any other electronic device or computing system capable of receiving input, executing computer program instructions, and communicating with another computing system through networks. Nodes 1 through n (denoted by numerals 131-1 though 131-*n*) are connected to ports 1 though n (denoted by numerals 121-1 though 121-*n*), respectively. Nodes 1 through n (131-1 though 131-*n*) are within in cloud cluster 130. Nodes 1 through n (131-1 though 131-*n*) in cloud cluster 130 share roles or have unique roles in overall operation of a distributed storage, compute, or analysis engine.

Referring to FIG. 1, network switch 110 further comprises port p (denoted by numeral 140) which is not within port group 120. Node p (denoted by numeral 145), which is not within cloud cluster 130, is connected to port p (140).

Referring to FIG. 1, one of nodes 1 through n (131-1 though 131-*n*) in cloud cluster 130, for example node 1 (131-1), is brought online on one of ports 1 though n (121-1 though 121-*n*), for example port 1 (121-1). In the same example, node 1 (131-1) sends a request to network switch 110 and initiates a queue of port group 120. When network switch 110 receives the request from node 1 (131-1), the network switch gathers information and sends it back to node 1 (131-1). The information includes, but is not limited to, physical or virtual port addresses in port group 120, network topology of port group 120, a list of MAC (Media Access Control) addresses of all the nodes logged onto the ports in port group 120, available IP (Internet Protocol) address for use in port group 120, any in-use IP address within port group 120, and available VLAN (Virtual Local Area Networks) addresses for use in port group 120. In the same example, node 1 (131-1) receives and stores the information. Node 1 (131-1) uses this information to bring all other nodes in cloud cluster 130 online and to enable all nodes within cloud cluster 130 to become aware of the topology of cloud cluster 130.

Figure 2:
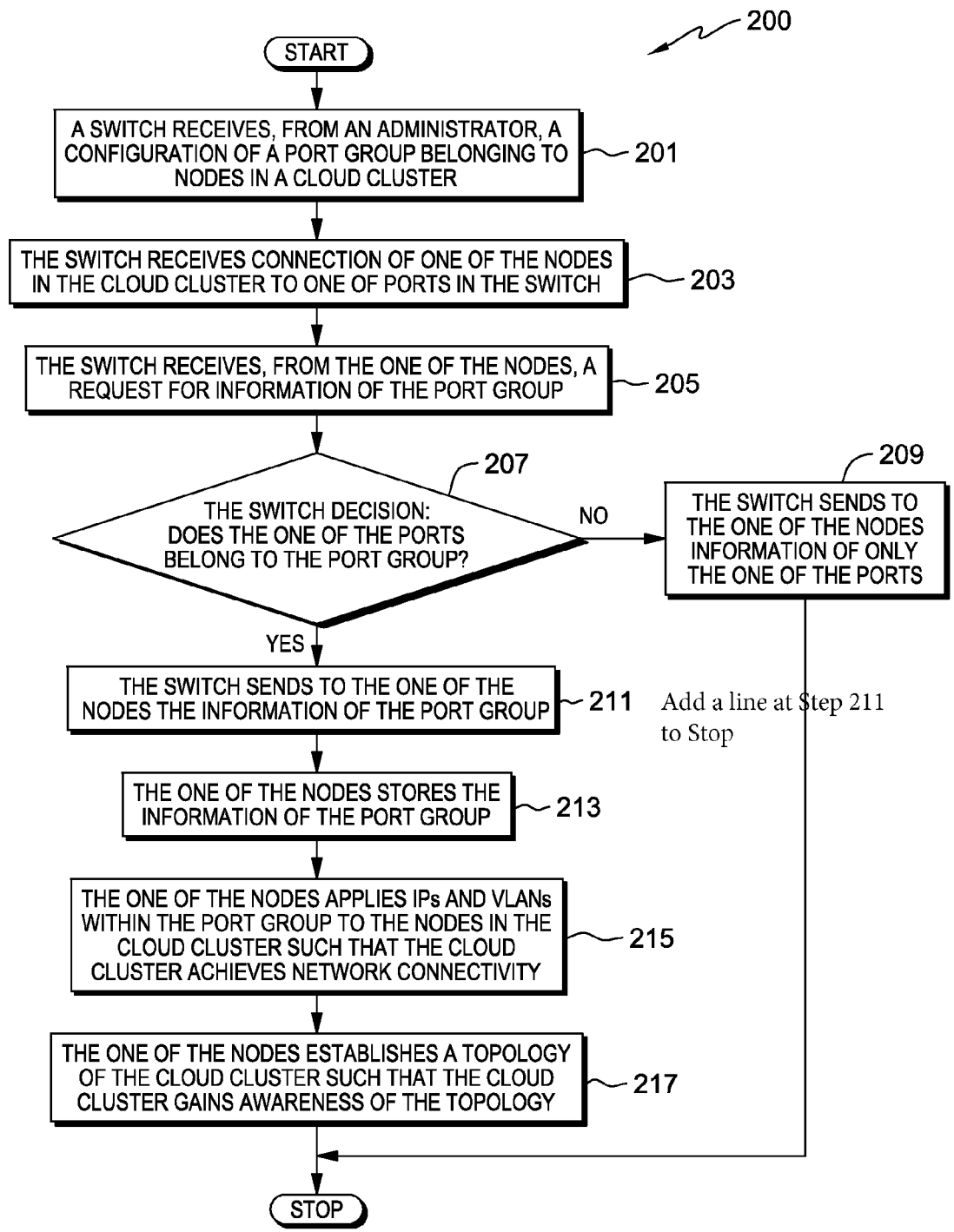
FIG. 2 is a flowchart illustrating operating steps for autonomous multi-node configuration and self-awareness through establishment of a switch port group, in accordance with one embodiment of the present invention.

FIG. 2 is flowchart 200 illustrating operating steps for autonomous multi-node configuration and self-awareness through establishment of port group 120 on network switch 110 shown in FIG. 1, in accordance with one embodiment of the present invention.

Referring to FIG. 2, at step 201, network switch 110 receives, from an administrator of the network, a configuration of port group 120 on network switch 110. Port group 120 is established by the administrator such that port group 120 belongs to nodes 1 through n (131-1 though 131-*n*) in cloud cluster 130. The goal is to create a common grouping of ports that share settings amongst the ports and the nodes attached to the ports. At step 203, network switch 110 receives connection of one of nodes 1 through n (131-1 though 131-*n*) in cloud cluster 130 to a port in port group 120. The port may be one of port 1 though n (121-1 though 121-*n*) in port group 120 or port p (140) which is not in port group 120. For example, node 1 (131-1) is connected to the port.

Referring to FIG. 2, at step 205, network switch 110 receives, from the one of nodes 1 through n (131-1 though 131-*n*), a request for information of port group 120. In the same example, network switch 110 receives the request from node 1 (131-1). The information includes, but is not limited to, physical or virtual port addresses in port group 120, network topology of port group 120, a list of MAC (Media Access Control) addresses of all the nodes logged onto the ports in port group 120, available IP addresses for use in port group 120, any in-use IP addresses within port group 120, and available VLAN (Virtual Local Area Networks) addresses for use in port group 120.

Referring to FIG. 2, at decision block 207, network switch 110 determines whether the port to which the one of nodes 1 through n (131-1 though 131-*n*) is connected, belongs to port group 120. In response to determining that the port does not belong to port group 120 ("NO" branch of decision block 207), at step 209, network switch 110 sends, to the one of nodes 1 through n (131-1 though 131-*n*), information of only the port to which the one of nodes 1 through n (131-1 though 131-*n*) is connected. For "NO" branch of decision block 207, no further step after step 209 in flowchart 200 will be processed.

In response to determining that the port belongs to port group 120 ("YES" branch of decision block 207), at step 211, network switch 110 sends, to the one of nodes 1 through n (131-1 though 131-*n*), the information of port group 120. In the same example, network switch 110 sends to node 1 (131-1) the information of port group 120. Under a situation where no other ports are mapped to port group 120, network switch 110 sends, to the one of nodes 1 through n (131-1 though 131-*n*), information regarding the only one port that belongs to port group 120; then, steps after step 211 in flowchart 200 will not be processed.

Referring to FIG. 2, at step 213, the one of nodes 1 through n (131-1 though 131-*n*), e.g., node 1 (131-1), stores the information of port group 120. From the information gathered, the one of nodes 1 through n (131-1 though 131-*n*), e.g., node 1 (131-1), now knows all available IPs and VLANs associated with port 1 though n (121-1 though 121-*n*) in port group 120. This information is used within local automation to initiate configurations of other nodes in cloud cluster 130. The stored information is used by the one of nodes 1 through n (131-1 though 131-*n*), e.g., node 1 (131-1), to bring all other nodes in cloud cluster 130 online, and to enable all nodes within cloud cluster 130 to become aware of the topology of cloud cluster 130.

Referring to FIG. 2, at step 215, the one of nodes 1 through n (131-1 though 131-*n*), e.g., node 1 (131-1), applies IP and VLAN addresses within port group 120 to all the nodes (namely, node 1 (131-1) through port n (131-*n*)) in cloud cluster 130, such that cloud cluster 130 achieves network connectivity. The IP and VLAN addresses are automatically assigned via the one of nodes 1 through n (131-1 though 131-*n*), e.g., node 1 (131-1), to other nodes in cloud cluster 130 so that network connectivity is achieved for all nodes in cloud cluster 130. This can all be done through automation due to the switch sharing information about port group 120.

Referring to FIG. 2, at step 217, the one of nodes 1 through n (131-1 though 131-*n*), e.g., node 1 (131-1), establishes a topology of cloud cluster 130, such that all the nodes in cloud cluster 130 gain awareness of the topology. From the information gathered by the one of nodes 1 through n (131-1 though 131-*n*), e.g., node 1 (131-1), it is possible for cloud cluster 130 to become aware of its own topology with regard to external network connectivity. This topology view can be used for actions, such as future diagnostics, configuration, service, upgrades, etc.

Figure 3:
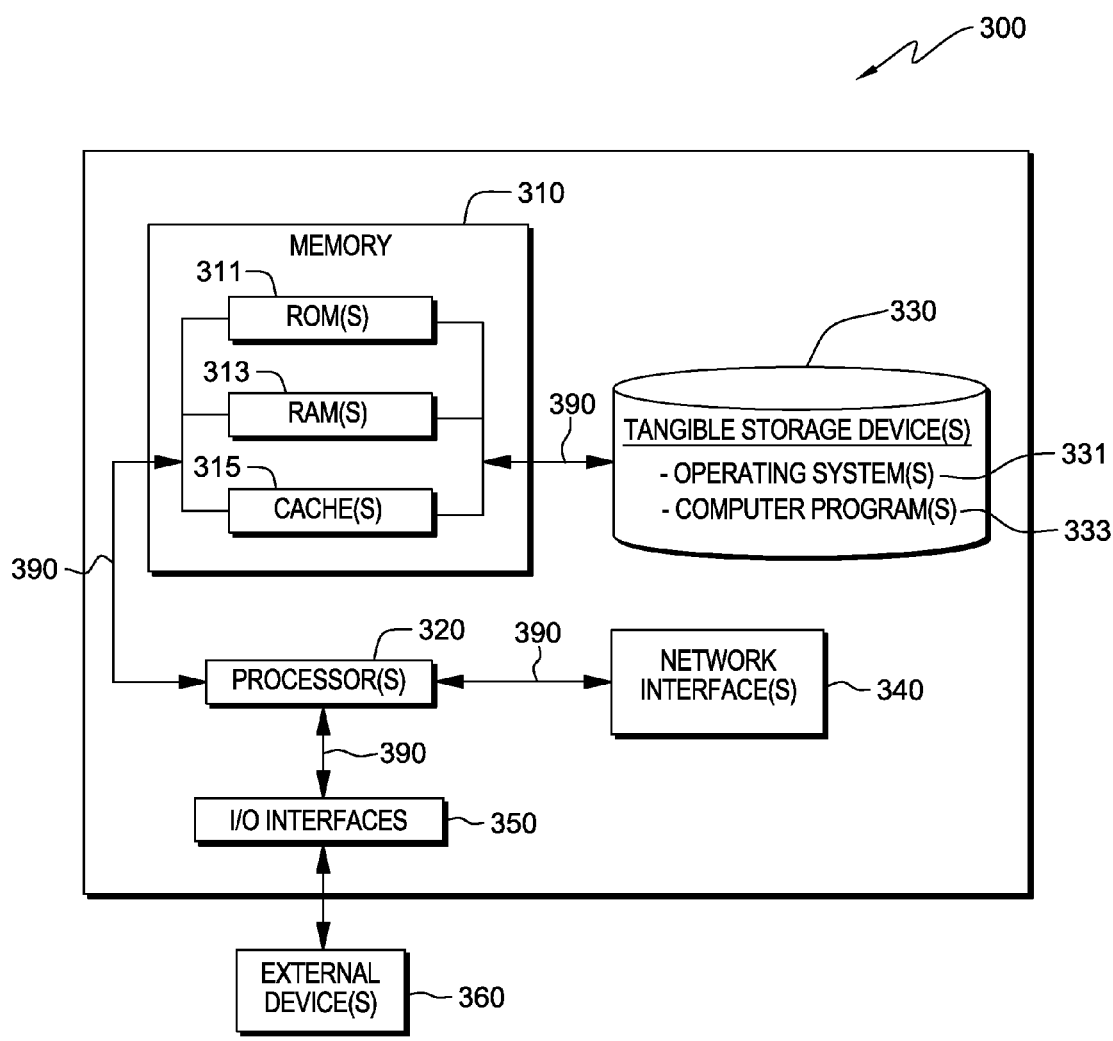
FIG. 3 is a diagram illustrating components of a computer system at a node in a cloud cluster shown in FIG. 1, in accordance with one embodiment of the present invention.

FIG. 3 is a diagram illustrating components of a computer system at a node in cloud cluster 130 shown in FIG. 1, in accordance with one embodiment of the present invention. It should be appreciated that FIG. 3 provides only an illustration of one implementation and does not imply any limitations with regard to the environment in which different embodiments may be implemented.

Referring to FIG. 3, computer device 300 includes processor(s) 320, memory 310, tangible storage device(s) 330, network interface(s) 340, and I/O (input/output) interface(s) 350. In FIG. 3, communications among the above-mentioned components of computing device 300 are denoted by numeral 390. Memory 310 includes ROM(s) (Read Only Memory) 311, RAM(s) (Random Access Memory) 313, and cache(s) 315. One or more operating systems 331 and one or more computer programs 333 reside on one or more computer-readable tangible storage device(s) 330. Computing device 300 further includes I/O interface(s) 350. I/O interface(s) 350 allows for input and output of data with external device(s) 360 that may be connected to computing device 300. Computing device 300 further includes network interface(s) 340 for communications between computing device 300 and a computer network.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device, such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN), and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language, or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture, including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for establishing connectivity of nodes in a cloud cluster to a network switch, the method comprising:
    receiving, by the network switch, a configuration of a switch port group on the network switch, wherein the switch port group comprises ports configured for the cloud cluster, and respective ones of the nodes are connected to respective ones of the ports;
    receiving from one of the nodes, by the network switch, a request for information of the switch port group;
    sending to the one of the nodes, by the network switch, the information of the switch port group, wherein the information comprises IP (Internet Protocol) addresses and VLAN (Virtual Local Area Network) addresses available in the switch port group; and
    in response to determining that the one of the nodes is connected to one of ports that are not in the switch port group, sending to the one of the nodes, by the network switch, information of only the one of the ports that are not in the switch port group;
    wherein the one of the nodes assigns automatically the IP and VLAN addresses to the nodes in the cloud cluster, the information of the switch port group is stored by the one of the nodes, the information is used by the one of the nodes to assign the IP and VLAN addresses to the nodes in the cloud cluster, the information is used by the one of the nodes to establish a topology of the cloud cluster, and the connectivity of the nodes in the cloud cluster to the network switch is established by the one of the nodes.

2. The method of claim 1, further comprising:
    sending, by the one of the nodes, the request for the information of the switch port group;
    receiving from the network switch, by the one of the nodes, the information of the switch port group;
    storing, by the one of the nodes, the information of the switch port group; and
    assigning, by the one of the nodes, the IP and VLAN addresses to the nodes in the cloud cluster.

3. The method of claim 1, further comprising:
    establishing, by the one of the nodes, the topology of the cloud cluster.

4. The method of claim 1, wherein the ports in the switch port group share settings among the ports in the switch port group and the nodes in the cloud cluster.

5. The method of claim 1, wherein the nodes in the cloud cluster are computer systems, and wherein each of the nodes has a unique role in operation of the cloud cluster.

6. A computer program product for establishing connectivity of nodes in a cloud cluster to a network switch, the computer program product comprising a computer readable hardware storage device having program code embodied therewith, the program code executable to:
    receive, by the network switch, a configuration of a switch port group on the network switch, wherein the switch port group comprises ports configured for the cloud cluster, and respective ones of the nodes are connected to respective ones of the ports;
    receive from one of the nodes, by the network switch, a request for information of the switch port group;
    send to the one of the nodes, by the network switch, the information of the switch port group, wherein the information comprises IP (Internet Protocol) addresses and VLAN (Virtual Local Area Network) addresses available in the switch port group; and
    in response to determining that the one of the nodes is connected to one of ports that are not in the switch port group, send to the one of the nodes, by the network switch, information of only the one of the ports that are not in the switch port group;
    wherein the one of the nodes assigns automatically the IP and VLAN addresses to the nodes in the cloud cluster, the information of the switch port group is stored by the one of the nodes, the information is used by the one of the nodes to assign the IP and VLAN addresses to the nodes in the cloud cluster, the information is used by the one of the nodes to establish a topology of the cloud cluster, and the connectivity of the nodes in the cloud cluster to the network switch is established by the one of the nodes.

7. The computer program product of claim 6, wherein the program code is further executable to:
    send, by the one of the nodes, the request for the information of the switch port group;
    receive from the network switch, by the one of the nodes, the information of the switch port group;
    store, by the one of the nodes, the information of the switch port group; and
    assign, by the one of the nodes, the IP and VLAN addresses to the nodes in the cloud cluster.

8. The computer program product of claim 6, wherein the program code is further executable to:
    establish, by the one of the nodes, the topology of the cloud cluster.

9. The computer program product of claim 6, wherein the ports in the switch port group share settings among the ports in the switch port group and the nodes in the cloud cluster.

10. The computer program product of claim 6, wherein the nodes in the cloud cluster are computer systems, and wherein each of the nodes has a unique role in operation of the cloud cluster.

11. A computer system for establishing connectivity of nodes in a cloud cluster to a network switch, the computer system comprising:
    one or more processors, one or more computer-readable tangible storage devices, and program instructions stored on at least one of the one or more computer-readable hardware storage devices, the program instructions executable by at least one of the one or more processors to:
    receive, by the network switch, a configuration of a switch port group on the network switch, wherein the switch port group comprises ports configured for the cloud cluster, and respective ones of the nodes are connected to respective ones of the ports;
    receive from one of the nodes, by the network switch, a request for information of the switch port group;

send to the one of the nodes, by the network switch, the information of the switch port group, wherein the information comprises IP (Internet Protocol) addresses and VLAN (Virtual Local Area Network) addresses available in the switch port group; and in response to determining that the one of the nodes is connected to one of ports that are not in the switch port group, send to the one of the nodes, by the network switch, information of only the one of the ports that are not in the switch port group;

wherein the one of the nodes assigns automatically the IP and VLAN addresses to the nodes in the cloud cluster, the information of the switch port group is stored by the one of the nodes, the information is used by the one of the nodes to assign the IP and VLAN addresses to the nodes in the cloud cluster, the information is used by the one of the nodes to establish a topology of the cloud cluster, and the connectivity for the nodes in the cloud cluster to the network switch is established by the one of the nodes.

12. The computer system of claim 11, wherein the program instructions are further executable by at least one of the one or more processors to:

send, by the one of the nodes, the request for the information of the switch port group;

receive, from the network switch, by the one of the nodes, the information of the switch port group;

store, by the one of the nodes, the information of the switch port group; and assign, by the one of the nodes, the IP and VLAN addresses to the nodes in the cloud cluster.

13. The computer system of claim 11, wherein the program instructions are further executable by at least one of the one or more processors to:

establish, by the one of the nodes, the topology of the cloud cluster.

14. The computer system of claim 11, wherein the ports in the switch port group share settings among the ports in the switch port group and the nodes in the cloud cluster.

15. The computer system of claim 11, wherein the nodes in the cloud cluster are computer systems, and wherein each of the nodes has a unique role in operation of the cloud cluster.

* * * * *